(12) United States Patent
Conesa et al.

(10) Patent No.: US 7,662,474 B2
(45) Date of Patent: Feb. 16, 2010

(54) FLAME-RETARDANT PLASTIC COMPOSITION, YARN AND TEXTILE STRUCTURE COATED THEREWITH

(75) Inventors: Isabelle Conesa, St Romain de Jalionas (FR); Francois-Xavier Damour, Lyons (FR)

(73) Assignee: Chavanoz Industrie, Chavanoz (FR)

( * ) Notice: Subject to any disclaimer, the term of this patent is extended or adjusted under 35 U.S.C. 154(b) by 0 days.

(21) Appl. No.: 11/798,603

(22) Filed: May 15, 2007

(65) Prior Publication Data

US 2007/0231574 A1 Oct. 4, 2007

Related U.S. Application Data

(63) Continuation of application No. 09/936,923, filed on Dec. 3, 2001, now abandoned.

(30) Foreign Application Priority Data

Mar. 23, 1999 (FR) .................................. 99 03764
Mar. 30, 1999 (FR) .................................. 99 04202

(51) Int. Cl.
*D02G 3/36* (2006.01)
(52) U.S. Cl. ...................... 428/373; 428/364; 428/374; 428/375
(58) Field of Classification Search .................. None
See application file for complete search history.

(56) References Cited

U.S. PATENT DOCUMENTS

| 2,618,621 | A |   | 11/1952 | Burt |
|---|---|---|---|---|
| 3,273,987 | A | * | 9/1966 | Otto et al. ..................... 65/60.3 |
| 3,639,299 | A |   | 2/1972 | MacDowall |
| 3,761,346 | A | * | 9/1973 | Caroselli et al ............. 428/152 |
| 3,926,894 | A |   | 12/1975 | de Paul Clark |
| 3,971,744 | A |   | 7/1976 | Hudecek et al. |
| 4,256,786 | A |   | 3/1981 | Dias et al. |
| 4,421,619 | A |   | 12/1983 | Graham |
| 4,801,493 | A |   | 1/1989 | Ferziger et al. |
| 5,153,342 | A |   | 10/1992 | DiBella |
| 5,298,542 | A |   | 3/1994 | Nakamura et al. |
| 5,444,110 | A |   | 8/1995 | Kitazawa et al. |
| 5,523,059 | A |   | 6/1996 | Langer |
| 5,723,515 | A |   | 3/1998 | Gottfried |
| 5,736,109 | A |   | 4/1998 | Howorth et al. |
| 5,853,675 | A |   | 12/1998 | Howorth |
| 5,942,330 | A |   | 8/1999 | Kelley |
| 6,000,189 | A |   | 12/1999 | Breuer et al. |
| 6,032,454 | A | * | 3/2000 | Damour et al. ............... 57/232 |
| 6,309,745 | B1 |   | 10/2001 | Willms et al. |
| 6,309,746 | B1 |   | 10/2001 | Broutier et al. |
| 6,809,147 | B1 |   | 10/2004 | Ohno et al. |
| 6,916,869 | B2 |   | 7/2005 | Eto et al. |
| 6,989,409 | B2 |   | 1/2006 | Loehden et al. |

FOREIGN PATENT DOCUMENTS

| DE | 34 44 163 A1 | 6/1986 |
|---|---|---|
| FR | 2 755 973 A1 | 5/1998 |
| GB | 1516510 | 7/1978 |
| GB | 1581493 | 10/1980 |
| GB | 2 079 801 A | 1/1982 |
| JP | 8100098 | 4/1996 |
| JP | A-8-100098 | 4/1996 |
| WO | WO 9742363 A1 * | 11/1997 |
| WO | WO 9822555 A1 * | 5/1998 |
| WO | WO 98/29507 | 7/1998 |

OTHER PUBLICATIONS

Database WPI, XP-002124179, Section Ch, Week 199821, Derwent Publications Ltd., London, GB; Class A14, AN 1998-238259.
Database WPI, XP-002124180, Section Ch, Week 199026, Derwent Publications Ltd., London, GB; Class A18, AN 1990-196094.

* cited by examiner

*Primary Examiner*—Jill Gray
(74) *Attorney, Agent, or Firm*—Oliff & Berridge, PLC

(57) ABSTRACT

The invention concerns a halogen-free flame retardant plastic composition, for coating a substrate, comprising an acrylic resin and an intumescent agent. It is in the form of plastisol, and comprises therefore a plasticizing medium wherein the acrylic resin and the intumescent agent are dispersed, said plastisol being formulated such that, in combination: the viscosity remains not more than 6000 mPa's, measured with a Brookfield RVT viscometer at 20 revolutions per minute, its rheological behavior is pseudo-plastic and Newtonian.

9 Claims, No Drawings

FLAME-RETARDANT PLASTIC COMPOSITION, YARN AND TEXTILE STRUCTURE COATED THEREWITH

This is a Continuation of application Ser. No. 09/936,923 filed Dec. 3, 2001, which in turn is a U.S. National Phase of Application No. PCT/FR00/00738, filed Mar. 23, 2000. The disclosure of the prior applications is hereby incorporated by reference herein in its entirety.

The present invention relates to a halogen-free flame-retarded composition intended for coating a substrate, for example yarns or textile structures, in order to meet all particular specifications or applications, for example for the manufacture of sun screens such as blinds or curtains. More specifically, the invention relates to a flame-retarded composition, in the plastisol state, comprising a plasticizing medium, at least one acrylic resin, dispersed in said plasticizing medium, and an intumescent agent.

It is generally already known that there are composite yarns, which the Applicant manufactures and sells, comprising:

- a core comprising a continuous yarn, especially made of an inorganic material, for example glass;
- a sheath or jacket comprising a matrix consisting of at least one chloropolymer material, for example a polyvinyl chloride (PVC);
- a flame-retarding mineral filler incorporated into and distributed in said matrix; and
- a plasticizer.

Preferably, but not exclusively, such a yarn is obtained by coating the core with a plastisol comprising the chloropolymer material, for example PVC, and the plasticizer, and then by gelling the plastisol around the core.

Moreover, the Applicant has disclosed a halogen-free flame-retarded plastic composition, described in document FR-A-2 755 973, applicable to a substrate, such as a yarn made of a mineral or organic material, of natural or synthetic origin, such as glass, polyester, polyamide, polypropylene, polyethylene, and containing no halogen or halogenated compound. This flame-retarded plastic composition includes a binding fraction, which binds said composition, and an intumescent agent consisting at least of a strong-acid compound, which is thermally degradable, and a polyhydric carbon compound. Said binding fraction as such has a limiting oxygen index (LOI) at least equal to 25% and the intumescent agent essentially consists of said strong-acid compound and said polyhydric carbon compound, the solids content of the composition having a weight ratio of said strong-acid compound to said polyhydric carbon compound of between 1.5 and 2, and preferably of 1.85.

The flamed-retarded composition described may be in solid, molten or liquid form. Preferably, this composition is in the form of an aqueous dispersion.

Specialty fabrics obtained from yarns as described above, and when they are used in various environments, especially for furnishing both the interior and exterior of buildings or constructions, for example as blinds, are subject to fire behavior requirements defined by national or international homologation or authorization regulations and/or procedures.

Thus, the regulations applicable to such fabrics in the Federal Republic of Germany define various classifications characterized especially by the length of the specimen destroyed by the fire and by the temperature of the combustion smoke, these classifications being identified by the letters B1 to B3, the letter B1 characterizing the best fire behavior achievable by a material comprising organic materials.

As regards the regulations applicable in France, these also define various classifications characterized, on the one hand, especially by smoke emission and identified by the letters F0 to F5, F3 being the best behavior achievable by a material containing a halogenated polymer, and characterized, on the other hand, especially by the ignition time of the fabric and identified by the letters M0 to M4 the letter M1 identifying the best fire behavior generally achievable by a material comprising organic materials.

For the purposes of meeting the requirements in terms of fire behavior, it is known to incorporate into any plastic composition a suitable intumescent agent, formulated with the resin so as to achieve the required level of flame retardation.

With regard to coating a substrate, and in particular the core of a yarn, with a flame-retarded plastic composition, comprising an acrylic resin and an intumescent agent, the Applicant has sought the most appropriate coating method, that is to say a method capable of preserving, at the end, the properties of the yarn or of the composite structure obtained, in terms of heat-sealability and resistance to both high and low temperatures.

With regard to a yarn, the Applicant has firstly adopted, for this purpose, a coating method in which the core is passed through a die, with peripheral delivery around the core of a sheath of the flame-retarded plastic composition, in the ungelled plastisol state, that is to say with a plasticizing medium in which both the acrylic resin and the intumescent agent are distributed.

This way of applying the flame-retarded plastic composition to the substrate, that is to say in the plastisol state, avoids having to melt the resin, at a high temperature, which might degrade the final properties of the latter and degrade the intumescent agent.

Next, the Applicant sought optimal rheological properties of the flame-retarded compositions according to the invention, compatible with the coating processes using dies with a high shear rate (for example of the order of at least 15 000 to 20 000 $s^{-1}$ or even 100 000 $s^{-1}$).

According to the invention, this compatibility is obtained when the plastisol exhibits, at low shear rates, for example less than 300-400 s [sic], Newtonian-type behavior with a viscosity of less than or equal to 6000 mPa·s, measured using a Brookfield RVT viscometer at 20 revolutions per minute, and, at high shear rates, for example greater than 10 000 $s^{-1}$, pseudoplastic-type behavior.

As a person skilled in rheology knows, Newtonian behavior is characterized by a shear stress which varies linearly with shear rate and pseudoplastic behavior is characterized by a shear stress which reaches a limiting value when the shear rate increases.

In the case of the present invention, Newtonian behavior is revealed when it is possible to measure the viscosity of the flame-retarded composition using any suitable method, whether standardized or not, and pseudoplastic behavior is revealed by the ability of the flame-retarded composition to pass, without flow, through a coating die with a high shear rate, for example of the order of 15 000 to 20 000 $s^{-1}$.

Preferably, so as to preserve the properties of the composite yarn obtained, especially its heat-sealability and its weatherability, the weight proportion of the plasticizing medium comprising a phosphate is at most equal to 200% with respect to the weight of acrylic resin and/or the weight proportion of the intumescent agent is at most equal to 200% with respect to the weight of acrylic resin.

The plasticizing medium comprises predominantly, by weight, an organic phosphate, possibly and preferably with a phthalate.

The proportion by weight of intumescent agent is between 50 and 200%, and preferably between 150 and 200%, by weight of resin.

Any composite yarn or any composite textile structure, capable of being obtained by coating and then gelling a flame-retarded composition as defined above may achieve a fire resistance according to French Standard NFP 92503, especially classification level M1, and also good weatherability, meeting the ISO 105 standard, and finally good heat-sealability.

In the description and claims, the terms and expressions indicated below have the following meanings:

- an "acrylic resin" is any synthetic polymer derived from propenoic acid;
- "a thermally degradable strong-acid compound" is a compound which releases a strong acid either by itself or in situ from a precursor, at high temperature, that is to say at between about 100° C. and about 250° C.;
- "a polyhydric carbon compound" is a compound generally chosen from the various classes of carbohydrates and having a relatively high amount of carbon and many hydroxyl sites;
- "a liquid phosphorus derivative" is a flame-retarding product which comprises phosphate groups and is in liquid form;
- "a gas-generating agent" is a product which, by thermal degradation due to the effect of temperature, releases a gas, for example carbon dioxide or ammonia;
- "a plastisol in the gelled state" is a dispersion of polymers, fillers and various additives in a plasticizer.

In another preferred embodiment according to the invention, the flame-retarded plastic composition also comprises a phosphate-type plasticizer. With a phosphate/phthalate-type plasticizer, the performance is better, in terms of low viscosity, and there is less plasticizer exudation after gelling.

As examples of phthalate-type plasticizers, mention may be made of the plasticizers PALATINOL C and PALATINOL N available from BASF.

As phosphate-type plasticizers, mention may be made of DISFLAMOLL DPO and DPK® available from Bayer.

As examples of phosphate/phthalate-type plasticizers, mention may be made of those available from Solutia.

In yet another preferred embodiment according to the invention, the acrylic resin is a homopolymer or copolymer based on methyl methacrylate.

Such a resin may, for example, be chosen from the resins BM 310® and BM 410® available from Röhm.

The flame-retarded plastic composition according to the invention may also include UV stabilizers and/or opacifiers and/or pigments and/or viscosity-reducing processing aids.

As UV stabilizers, mention may especially be made of compounds of the benzophenone type, such as TINUVIN P available from Witco, or compounds of the benzotriazole type, such as TINUVIN 320 available from Witco or LOWI-LITE 55 available from Great Lakes.

As opacifiers, mention may especially be made of calcium carbonates and zinc sulfides.

As pigments, mention may especially be made of products from the IRGALITHE or CHROMOPHTAL ranges available from Ciba-Geigy.

As viscosity-reducing processing aids, mention may especially be made of the viscosity reducers available from Byk Chemie.

The intumescent agent of the composition according to the invention therefore comprises at least one strong-acid compound.

Preferably, the thermally degradable strong-acid compound is chosen from the group consisting of phosphoric acids, boric acids, and salts of these acids with a volatile cation, and preferably ammonium polyphosphate. This is because the acid source agent is chosen to be able to dehydrate, effectively, the carbon source agent, if it is present, above a certain temperature or in the presence of a flame, and to release the acid in temperature ranges close to the ignition temperature of the substrate to be flame-retarded.

The intumescent agent may also comprise a polyhydric carbon compound. The polyhydric carbon compound is preferably a starch or a polyhydric alcohol, and more preferably pentaerythritol. This is because these agents contain a relatively high amount of carbon and have many hydroxyl sites, thereby favoring the formation of a highly expanded residue.

The intumescent agent may also comprise liquid phosphorus derivatives which make it possible to further reduce the viscosity of the fluid plastisol. These derivatives are preferably chosen from products of the FYROL® range available from Akzo.

The intumescent agent may also comprise gas-generating agents such as, in particular, melamine.

In a highly preferred embodiment according to the invention, the flame-retarded plastic composition comprises, by weight:

| | |
|---|---|
| acrylic resin | 100.00 parts |
| phosphate/phthalate plasticizers | 125.00 parts |
| liquid phosphorus derivatives | 5.00 parts |
| ammonium polyphosphate and melamine | 97.50 parts |
| 50/50 pentaerythritol/melamine | 52.00 parts |

Another subject of the invention is a flame-retarded composite yarn comprising a core of low combustibility, made of a mineral or organic material, for example a halogen-free material, and a sheath made of a plastic capable of being obtained from the flame-retarded composition as defined above. The material of the core is, for example, a continuous glass filament.

The core made of halogen-free material of the composite yarn according to the invention may be chosen from the group consisting of a yarn made of a mineral or organic material, of natural or synthetic origin, such as glass, glass filament, polyester, polyamide, polypropylene and polyethylene. Preferably, a core made of a glass yarn or a continuous glass fiber, or filament, will be chosen.

The subject of the invention is also a textile structure in which the composite yarns as obtained above are assembled or entangled.

Another subject of the invention is a substrate of low combustibility, for example a textile structure, coated with a resin layer, obtained by coating and then gelling a flame-retarded composition as defined above.

Further subjects according to the invention are, respectively, a sun screen, a sign, and a covering for walls or ceilings, comprising a textile structure as defined above.

The examples which follow illustrate the invention but do not in any way limit the scope of the appended claims.

EXAMPLE 1

Formulation I of a Fire-retarded Plastic Composition

| Plastisol: | |
| --- | --- |
| Acrylic resin (BM 310 from Röhm) | 100.00 parts |
| Phosphate/phthalate plasticizer | 125.00 parts |
| Intumescent agent: | |
| Ammonium polyphosphate | 120.00 parts |
| Pentaerythritol | 31.00 parts |
| Melamine | 31.00 parts |
| Lubricant: | |
| Silicone oil | 2.50 parts |

Such a fire-retarded plastic composition has, in its Newtonian range, a viscosity of 4600 mPa·s measured using a Brookfield RVT viscometer at 20 revolutions per minute. Moreover, at high shear rates, it is pseudoplastic.

The fire behavior tests were carried out on glass fabrics coated with the fire-retarded plastic composition described above, as well as on composite yarns formed from about 54% (or 50%) of continuous glass filament and from 46% (or 50%) of the fire-retarded plastic composition described above.

The results of the tests carried out demonstrate that the M1 classification of the NFP 92503 Standard can be assigned to the textiles thus obtained.

EXAMPLE 2

Formulation II of a Flame-retarded Plastic Composition

| Plastisol: | |
| --- | --- |
| Acrylic resin (BM 310) from Röhm | 100.00 parts |
| Phosphate/phthalate plasticizer | 125.00 parts |
| Intumescent agent: | |
| Ammonium polyphosphate | 38.00 parts |
| Pentaerythritol | 31.00 parts |
| BUDIT 3077B fire-retarded system (available from Budenheim) | 150.00 parts |
| Lubricant: | |
| Silicone oil | 2.50 parts |

Such a fire-retarded plastic composition has, in its Newtonian range, a viscosity of 6000 mPa·s measured using a Brookfield RVT viscometer at 20 revolutions per minute. Moreover, at high shear rates, it is pseudoplastic.

The same tests as those described in Example 1 were repeated, giving the same results.

EXAMPLE 3

Formulation III of a Flame-retarded Plastic Composition

| Plastisol: | |
| --- | --- |
| Acrylic resin (BM 310) from Röhm | 80.00 parts |
| Acrylic resin (VP 8744) from Röhm | 20.00 parts |
| Phosphate/phthalate plasticizer | 130.00 parts |
| Intumescent system: | |
| Ammonium polyphosphate | 115.00 parts |
| Pentaerythritol | 31.00 parts |
| Melamine | 31.00 parts |
| Liquid phosphorus derivative | 5.00 parts |
| Lubricant: | |
| Silicone oil | 2.50 parts |
| Wetting agent | 5.00 parts |

Such a fire-retarded plastic composition has, in its Newtonian range, a viscosity of 4300 mPa·s measured using a Brookfield RVT viscometer at 20 revolutions per minute. Moreover, at high shear rates, it is pseudoplastic.

The same tests as those described in Example 1 were repeated, giving the same results.

EXAMPLE 4

Formulation IV of a Fire-retarded Plastic Composition

| Plastisol: | |
| --- | --- |
| Acrylic resin (BM 310) from Röhm | 80.00 parts |
| Acrylic resin (VP 8744) from Röhm | 20.00 parts |
| Phosphate plasticizer | 130.00 parts |
| Intumescent system: | |
| Ammonium polyphosphate | 115.00 parts |
| Pentaerythritol | 31.00 parts |
| Melamine | 31.00 parts |
| Lubricant: | |
| Silicone oil | 2.50 parts |

Such a fire-retarded plastic composition has, in its Newtonian range, a viscosity of 5250 mPa·s measured using a Brookfield RVT viscometer at 20 revolutions per minute. Moreover, at high shear rates, it is pseudoplastic.

The same tests as those described in Example 1 were repeated, giving the same results.

Many other fire-retarded plastic compositions may be formulated and qualified by routine tests, based on the above examples, and on the following supplementary considerations:

1) the final rheological behavior depends largely on the plasticizer used, more specifically on its chemical nature and its proportion; in this regard, a plasticizer comprising a phthalate must be preferred;

2) the proportion of the components or compounds in the intumescent agent has little effect on the final rheological behavior, since in particular the actual intumescent properties are desirable; in contrast, the proportion of the intumescent agent is important with regard to the final rheological behavior. This proportion must be limited, otherwise it will impair the fire retardancy;

3) any viscosity-reducing additive allows these rheological properties to be adjusted, if necessary.

What is claimed is:

1. A flame-retarded composite yarn comprising a core and a plastic sheath comprising a halogen-free fire retarded composition, consisting of at least one acrylic resin and an intumescent agent that are dispersed in a plasticizing medium, obtained by the process wherein:
    a) a die suitable for passage of the core of said yarn is used;
    b) the plastic sheath comprising a halogen-free fire retarded composition is used in an ungelled plastisol state;
    c) the core of the yarn is passed through said die, with a peripheral distribution of the plastisol around said core;
    d) rheological properties of the plastisol at a shear rate of the die, at least equal to 20,000 $s^{-1}$, are adapted by formulating said ungelled plastisol comprising a plasticizing medium comprising predominantly an organic phosphate and a phthalate, so that at low shear rate, at most equal to 400 $s^{-1}$, it exhibits a Newtownian behaviour, with a viscosity of less than or equal to 6,000 mPa·s, measured with a Brookfield RVT viscometer at 20 rpm, and at high shear rate, at least equal to 10,000 $s^{-1}$, it exhibits a pseudoplastic behaviour; and
    e) the gelling of the fire-retarded composition is carried out, wherein the plastic sheath is halogen free.

2. The yarn as claimed in claim 1, wherein the material of the core is a continuous glass filament.

3. A textile structure in which yarns as claimed in claim 1, are assembled or entangled.

4. A sun screen comprising a textile structure as claimed in claim 3.

5. A sign comprising a textile structure as claimed in claim 3.

6. A covering for walls or ceilings, comprising a textile structure as claimed in claim 3.

7. The yarn as claimed in claim 1, wherein a weight proportion of the plasticizing medium in the plastisol comprising a phthalate or a phosphate is at most equal to 200% with respect to the weight of acrylic resin and/or a weight proportion of the intumescent agent is at most equal to 200% with respect to the weight of acrylic resin.

8. The yarn as claimed in claim 1, wherein the proportion by weight of the plasticizing medium in the plastisol is between 100 and 200% by weight of resin.

9. The yarn as claimed in claim 1, wherein the proportion by weight of the intumescent agent in the plastisol is between 50 and 200% by weight of resin.

* * * * *